US 6,650,800 B2

(12) United States Patent
Litvin (10) Patent No.: US 6,650,800 B2
(45) Date of Patent: Nov. 18, 2003

(54) TIME SLOT TUNABLE ALL-OPTICAL PACKET DATA DEMULTIPLEXER

(75) Inventor: Kerry I. Litvin, Huntingdon Valley, PA (US)

(73) Assignee: General Instrument Corporation, Horsham, PA (US)

( * ) Notice: Subject to any disclaimer, the term of this patent is extended or adjusted under 35 U.S.C. 154(b) by 176 days.

(21) Appl. No.: 09/811,720

(22) Filed: Mar. 19, 2001

(65) Prior Publication Data

US 2003/0190109 A1 Oct. 9, 2003

(51) Int. Cl.$^7$ ............................ G02B 6/26; H04J 14/08
(52) U.S. Cl. ............................ 385/15; 385/24; 398/98; 398/101; 398/102
(58) Field of Search ............................ 385/15, 16, 39, 385/122, 24; 359/161, 173, 344, 123, 127, 128, 138, 139, 156; 398/79–88, 147, 98, 101, 102, 1

(56) References Cited

U.S. PATENT DOCUMENTS

| 5,060,305 | A |  | 10/1991 | Prucnal et al. |
| 5,073,980 | A |  | 12/1991 | Prucnal et al. |
| 5,493,433 | A |  | 2/1996 | Prucnal et al. |
| 5,825,519 | A |  | 10/1998 | Prucnal |
| 5,841,560 | A |  | 11/1998 | Prucnal |
| 5,917,628 | A |  | 6/1999 | Ooi et al. |
| 5,917,979 | A |  | 6/1999 | Prucnal |
| 5,926,496 | A |  | 7/1999 | Ho et al. |
| 6,115,121 | A |  | 9/2000 | Erskine |
| 2002/0015206 | A1 | * | 2/2002 | Hakimi et al. ............... 359/161 |
| 2002/0126946 | A1 | * | 9/2002 | Prucnal et al. ............... 385/16 |
| 2002/0181088 | A1 | * | 12/2002 | Dave et al. ............... 359/344 |

FOREIGN PATENT DOCUMENTS

| EP |  | 347903 A2 | 12/1989 |
| EP |  | 618747 A2 | 10/1994 |
| EP |  | 1059758 A2 | 12/2000 |
| WO | WO 96/22562 A1 | 7/1996 |
| WO | WO 01/05084 A1 | 1/2001 |

OTHER PUBLICATIONS

International Search Report for PCT Application No. PCT/US02/06855, mail date Aug. 13, 2002, 3 pages.
Nakamura et al., "168 Gbps Error–Free Demultiplexing With Hybrid–Integrated Symmetric Mach–Zehnder All–Optical Switch," Optical Fiber Conference 2000 Technology Digest, pp. 81–83, (Mar., 2000).
Sokoloff et al., "A Terahertz Optical Asymmetric Demultiplexer (TOAD)," IEEE Photonics Technology Letters, vol. 5, No. 7, pp. 787–790 (Jul., 1993).
Kang et al., "Ultrafast Optical Time Demultiplexers Using Semiconductor Optical Amplifiers," International Journal of High Speed Electronics and Systems, vol. 7, vol. 1, pp. 125–151 (1996).

* cited by examiner

Primary Examiner—Hemang Sanghavi
(74) Attorney, Agent, or Firm—Akin Gump Strauss Hauer & Feld, L.L.P.

(57) ABSTRACT

A fully "time tunable" all-optical demultiplexer selects which digital bits or groups of bits in an all-optical data packet or all-optical data burst are to be read/demultiplexed. The all-optical demultiplexer is implemented in either a semiconductor hybrid or in a completely monolithic form. The all-optical demultiplexer is formatted in either a "normally on" or "normally off" configuration. Variable time delay elements adjust the time delay of a clocking signal input and a data packet input. The clocking signal determines the state of two nonlinear optical elements, such as semiconductor optical amplifiers, incorporated in the upper and lower arms of a Mach-Zehnder configuration. Only desirable digital bits or groups of bits are outputted from the demultiplexer. All other undesirable bits are suppressed.

21 Claims, 13 Drawing Sheets

TIME SLOT TUNABLE ALL-OPTICAL PACKET DATA DEMULTIPLEXER

CROSS-REFERENCE TO RELATED APPLICATIONS

This application is related to co-pending application Ser. No. 09/811,749, entitled "TIME SLOT TUNABLE ALL-OPTICAL PACKET DATA ROUTING SWITCH," filed on Mar. 19, 2001.

BACKGROUND OF THE INVENTION

1. Field of the Invention

The present invention generally relates to all-optical demultiplexers and interferometers used for demultiplexing data.

2. Background Information

Conventional wavelength division multiplexing (WDM) systems efficiently use bandwidth in existing fiber-optic telecommunication infrastructures. Such systems provide point-to-point optical transmission at high aggregate rates (>100 Gb/s) without compromising on high performance. Future requirements of digital communication networks indicate that increased data-rate capacity is critical to a service provider's success in the market. Ultimately, all-optical networks will replace today's optical/electrical networks that suffer from the bottlenecking effects of optical-to-electrical-to-optical conversions due to the limited capacity of electronic devices. Devices that can optically process data without converting it to an electronic format are essential to this network capacity evolution.

Several forecasts have predicted that there will be a tremendous growth in the sensor market. In contrast to the classical sensors based largely upon the measurement of electrical parameters such as variable resistance or capacitance, modern sensors make use of a variety of novel phenomena. More importantly, these sensors are directly suitable for digital control and also have a degree of smartness incorporated in them to combat problems of nonlinearity and long term drift. Several key technologies are likely to play a major role in the sensors of the future. Microelectromechanical (MEM) sensors have tremendous potential as smart sensors. Fiber optics based sensors are also emerging as a viable and competitive technology. While many types of stand alone sensors are available, only some of them can be considered for integration with smart structures. Among these, fiber optic sensors are in the forefront in their choice for incorporation into materials and structures made of carbon and glass fiber reinforced polymer composites.

The advantages of fiber optic sensors (FOS) include freedom from EMI, wide bandwidth, compactness, geometric versatility and economy. In general, FOS is characterized by high sensitivity when compared to other types of sensors. FOS is also passive in nature due to the dielectric construction. Many signal processing devices (e.g., splitters, combiners, multiplexers, filters, delay lines) can also be made of fiber elements, thus enabling the realization of an all-fiber measuring system. Recently, photonic circuits (Integrated Optics) has been proposed as a single chip optical device or signal processing element which enables miniaturization, batch production, economy and enhanced capabilities.

A fiber optic sensor in general consists of a source of light, a length of sensing (and transmission) fiber, a photodetector, demodulation, processing and display optics and the required electronics. Interferometric (phase) sensors are based on the detection of changes in the phase of light emerging out of a single mode fiber. Interferometric fiber optic sensors are by far the most commonly used sensors since they offer the best performance.

A deficiency with prior art interferometers is that they cannot be "time tuned" to handle different demultiplexing requirements. Presently, a different interferometer must be used for different data stream reading applications.

BRIEF SUMMARY OF THE INVENTION

The present invention provides for the use of one or more variable time delay elements that enable the selection of desired digital bits or groups of bits in an all-optical data packet or all-optical data burst, while suppressing all other undesirable bits. The adjustment of the time delay value(s) associated with the variable time delay elements may be carried out to handle multiple demultiplexing requirements. Each requirement may use a different data stream reading application.

The present invention also provides for the monolithic integration of a variety of optical device structures construing the present invention, which together may be used to produce superior performance and increased utility over the prior art.

BRIEF DESCRIPTION OF THE DRAWINGS

The following detailed description of preferred embodiments of the present invention would be better understood when read in conjunction with the appended drawings. For the purpose of illustrating the present invention, there are shown in the drawings embodiments which are presently preferred. However, the present invention is not limited to the precise arrangements and instrumentalities shown. In the drawings.

DESCRIPTION OF THE INVENTION

1. Overview

Figure 1:
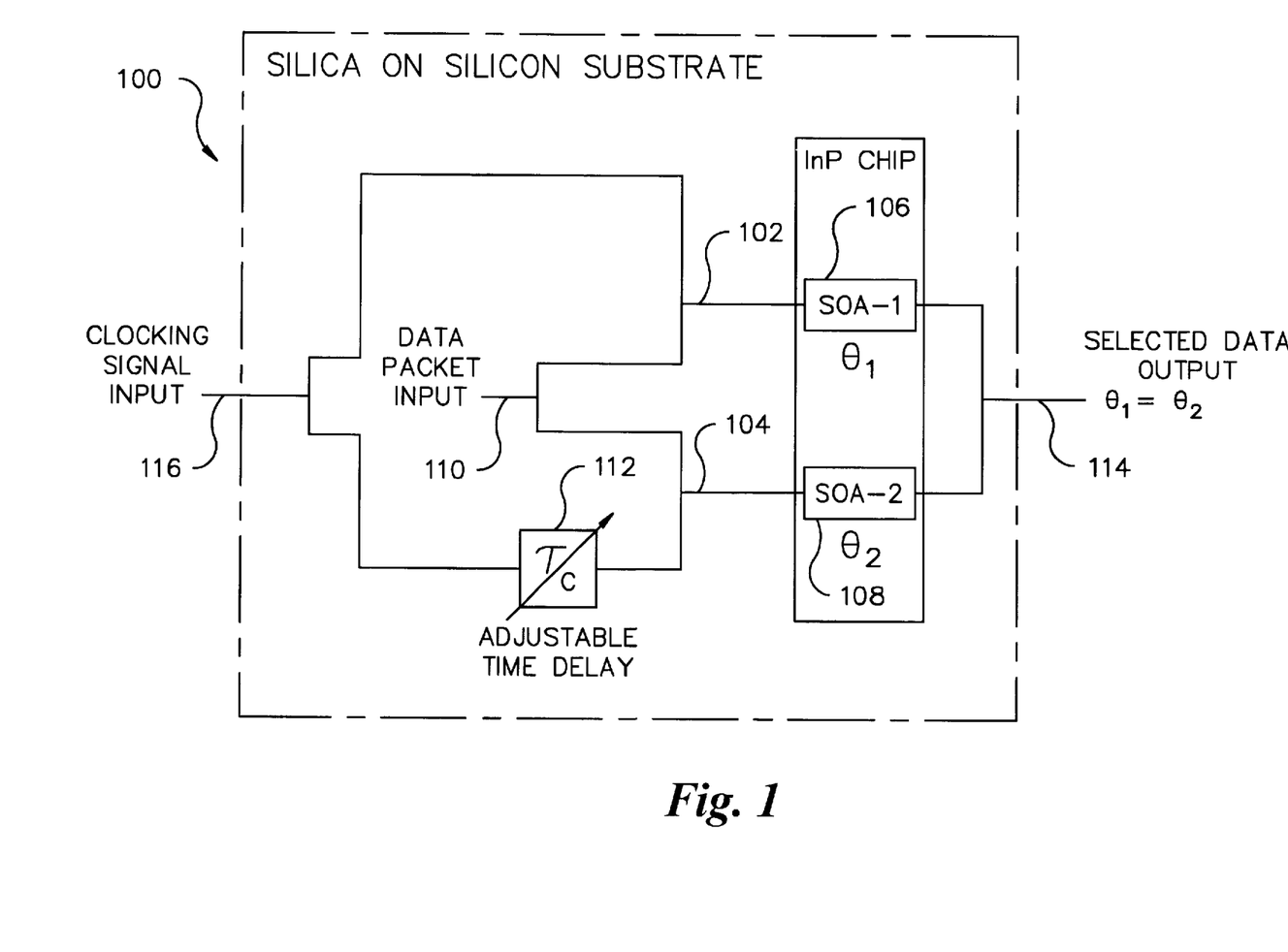
FIG. 1 shows a hybrid all-optical packet data demultiplexer chip (normally on) with a single adjustable time delay in accordance with the present invention.

FIG. 1 shows an all-optical demultiplexer 100 in semiconductor hybrid form in accordance with the present invention. The all-optical demultiplexer 100 comprises first and second arms 102, 104, each arm having a nonlinear optical element 106, 108, respectively, for receiving a data stream from data packet input 110. All-optical demultiplexer 100 also includes time delay element 112 having an adjustable time delay value $\tau_c$. The time delay element 112 is adjusted as desired to determine which individual bits or groups of bits in the data stream are suppressed. All other bits are outputted from selected data output 114. A clocking signal (control pulse signal) is fed into clocking signal input 116 to control the state of nonlinear optical elements 106, 108. The first and second arms 102, 104 in which nonlinear optical elements 106, 108 are inserted may constitute a Mach-Zehnder configuration. The nonlinear optical elements 106, 108 may be semiconductor optical amplifiers (SOAs).

Figure 2:
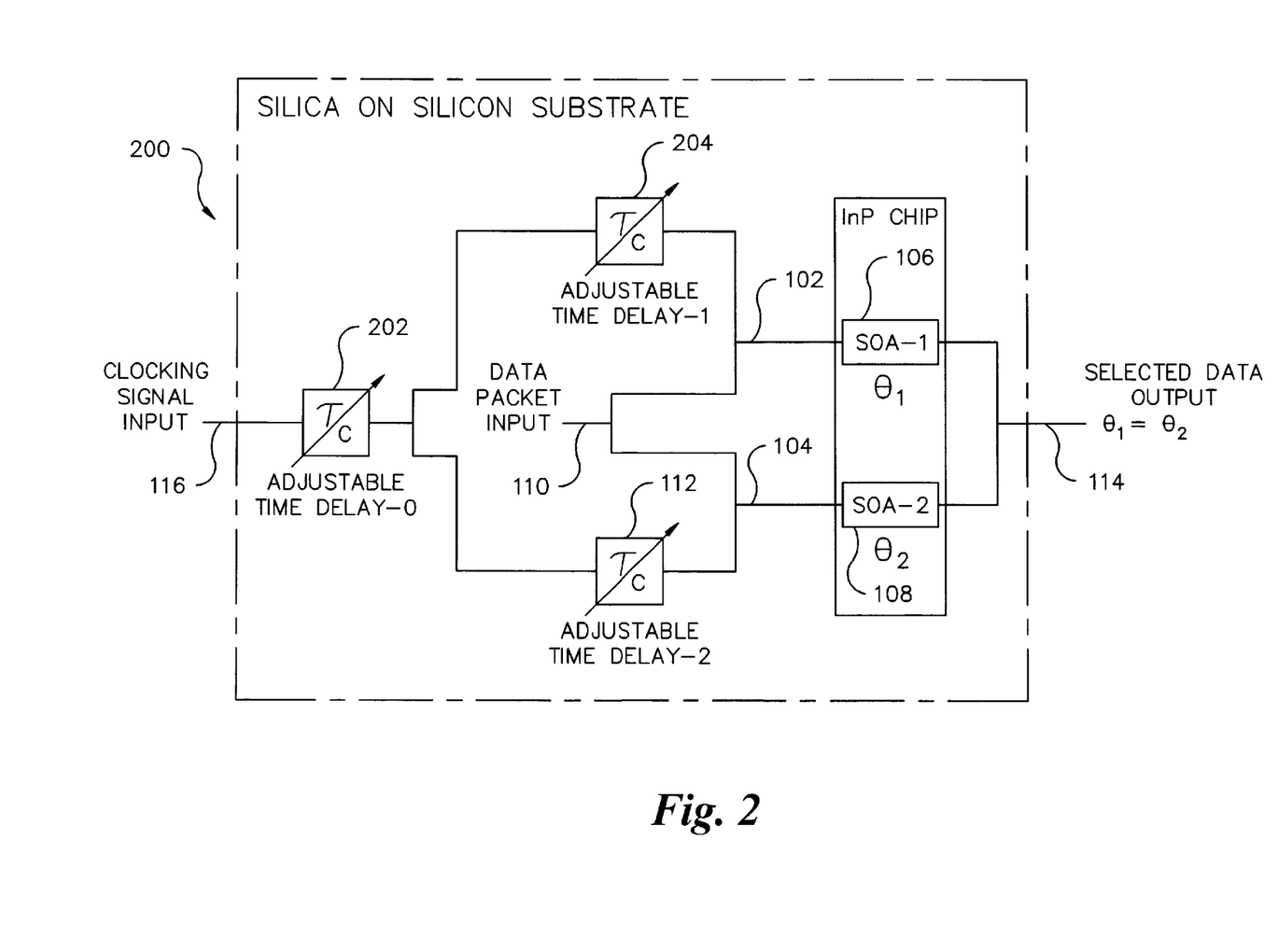
FIG. 2 shows a hybrid all-optical packet data demultiplexer chip (normally on) with multiple adjustable time delays in accordance with the present invention.

FIG. 2 shows an all-optical demultiplexer 200 in semiconductor hybrid form in accordance with the present invention. The all-optical demultiplexer 200 is similar to that shown in FIG. 1, with the exception that the all-optical demultiplexer 200 has two additional time delay elements 202, 204, each having an adjustable time delay value $\tau_c$. The time delay values $\tau_c$ of time delay elements 112, 202, 204 are varied to delay input signals that control the states of the nonlinear optical elements 106, 108. The adjustment of the time delay values $\tau_c$ associated with the time delay elements 112, 202, 204 may be carried out to handle different demultiplexing requirements. Each requirement may use a different data stream reading application.

The adjustable time delay elements 112, 202, 204 may be designed using several manufacturing techniques as follows:

(1) The time delay elements may consist of a material of variable thickness in the shape of a wedge or a staircase.

(2) The time delay elements may comprise a plurality of optical waveguides of various lengths.

(3) The time delay elements may contain a heating element which changes the properties of an optical waveguide when an electrical current is passed through the heating element.

(4) The time delay elements may comprise a waveguide having a variable index of refraction.

(5) The time delay elements may comprise an optical buffer having a recirculating optical waveguide loop.

(6) The time delay elements may comprise a material upon which an electro-optic effect is imposed.

Numerous other time delaying techniques may be incorporated into the present invention.

Figure 3:
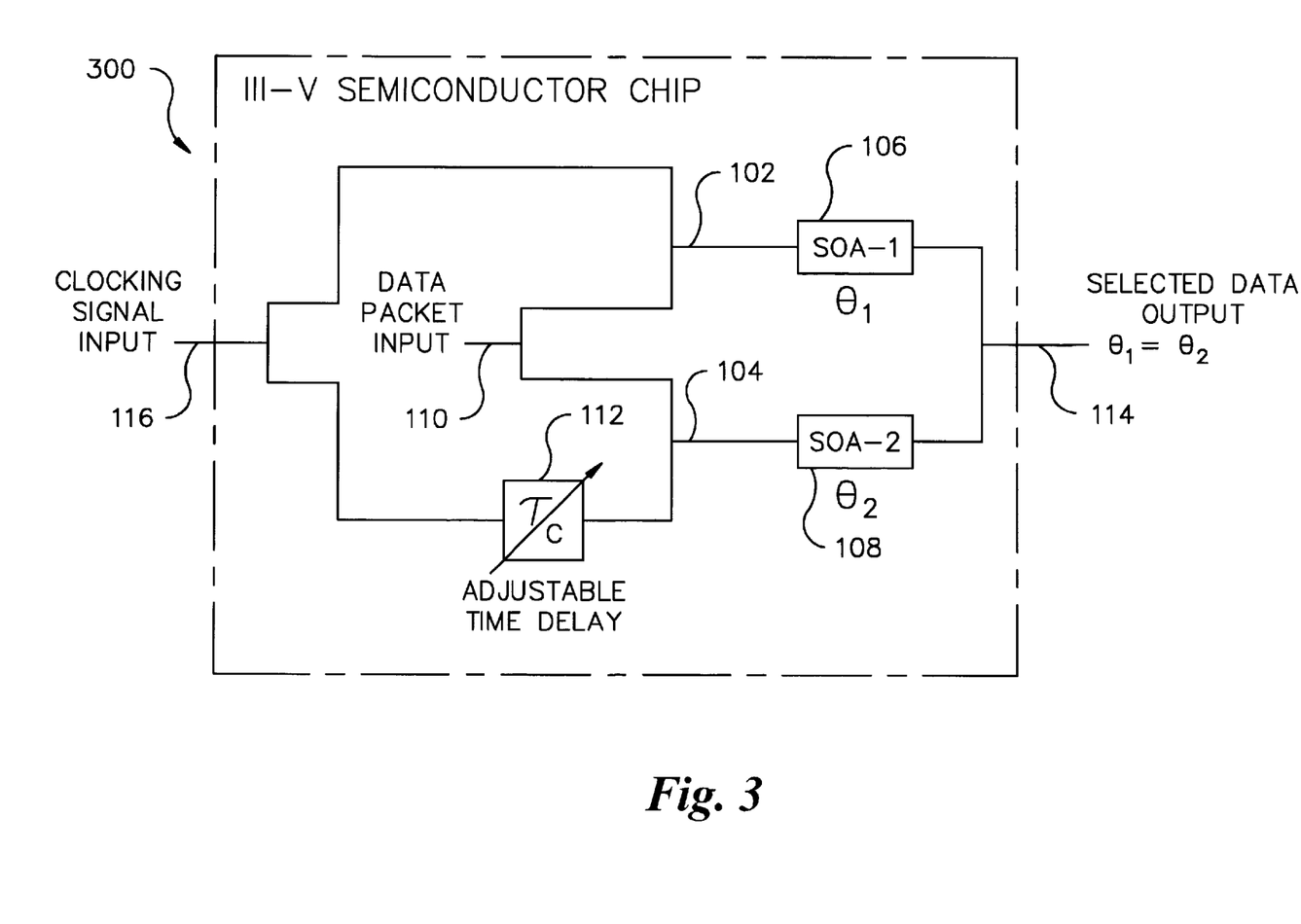
FIG. 3 shows a monolithic all-optical packet data demultiplexer chip (normally on) with a single adjustable time delay in accordance with the present invention.
Figure 4:
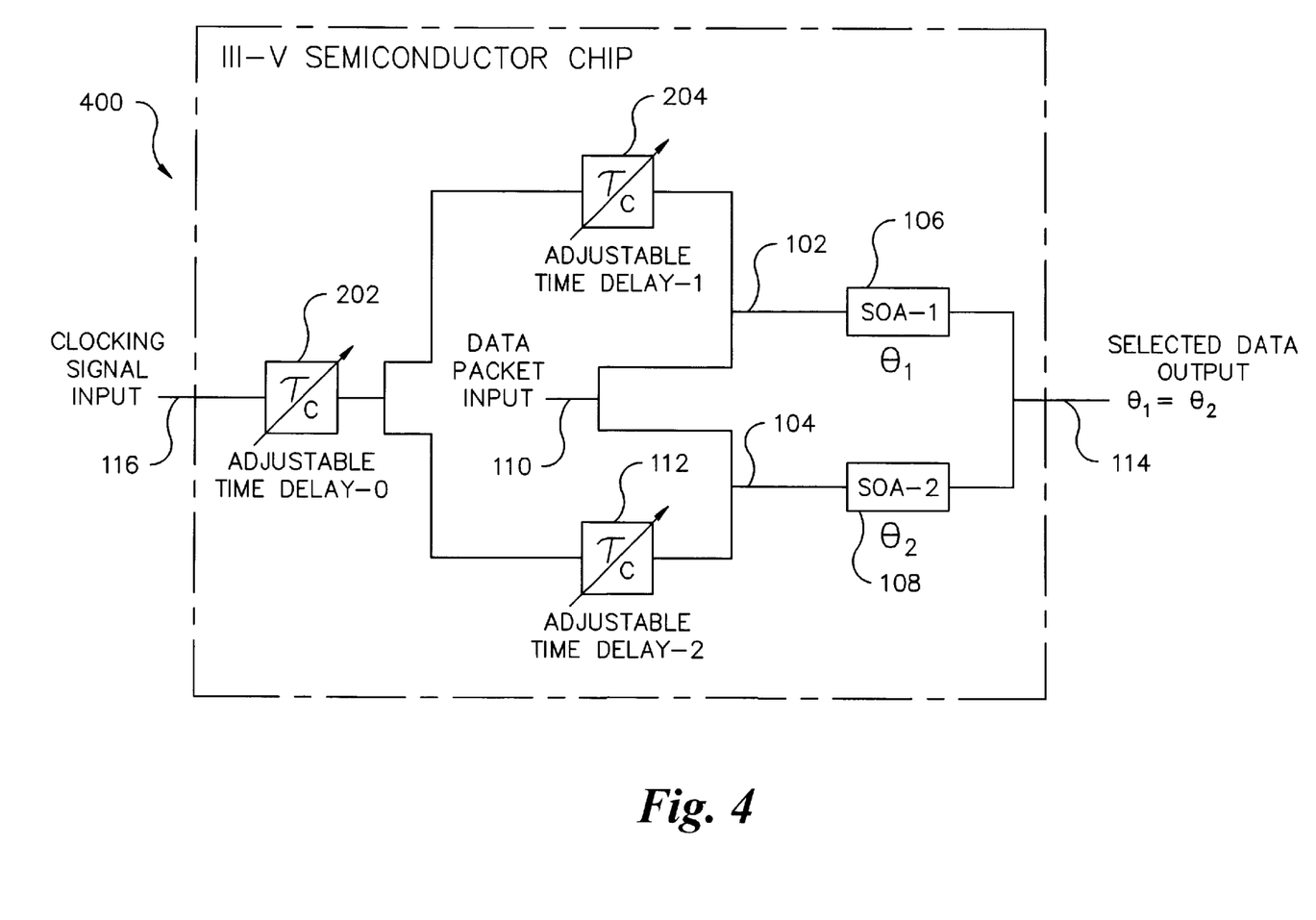
FIG. 4 shows a monolithic all-optical packet data demultiplexer chip (normally on) with multiple adjustable time delays in accordance with the present invention.

FIGS. 3 and 4 show all-optical demultiplexers 300 and 400, similar to all-optical demultiplexers 100 and 200, respectively, with the exception that all-optical demultiplexers 300 and 400 are monolithically integrated assemblies implemented using III–V compound semiconductor materials such as those typically grown on InP or GaAs substrates.

Figure 5:
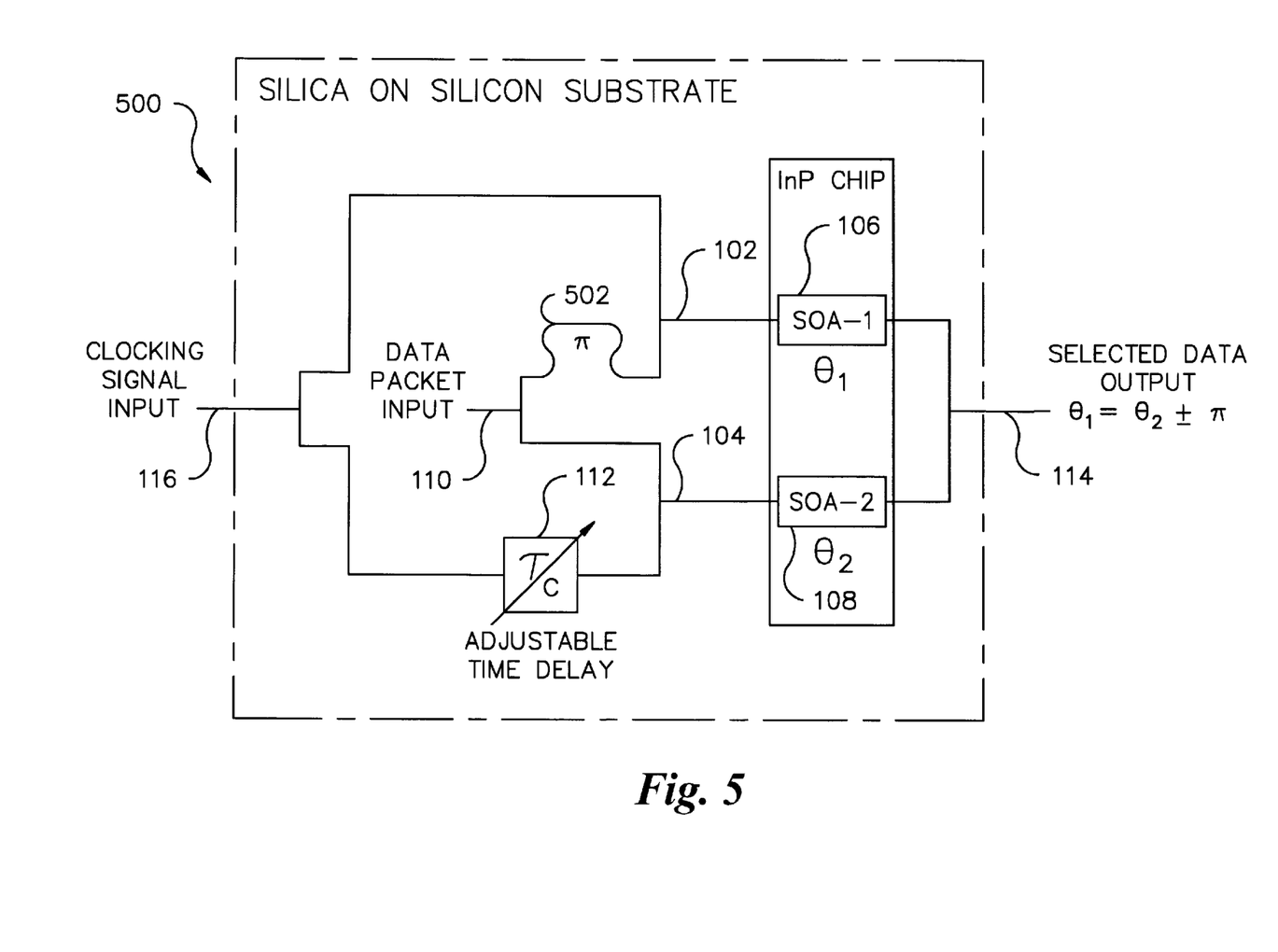
FIG. 5 shows a hybrid all-optical packet data demultiplexer chip (normally off) with a single adjustable time delay in accordance with the present invention.

FIG. 5 shows an all-optical demultiplexer 500 in semiconductor hybrid form in accordance with the present invention. The all-optical demultiplexer 500 comprises first and second arms 102, 104, each arm having a nonlinear optical element 106, 108 for receiving a data stream from data packet input 110. All-optical demultiplexer 500 also includes time delay element 112 having an adjustable time delay value $\tau_c$, and a fixed delay 502 having a fixed time delay value of $\pi$. The time delay element 112 is adjusted as desired to determine which bits should be outputted from selected data output 114. All other bits are suppressed. The first and second arms 102, 104 in which nonlinear optical elements 106, 108 are inserted may constitute a Mach-Zehnder configuration. The outputs of the nonlinear optical elements 106, 108 are fed to the selected data output 114. The data stream may be delayed by fixed time element 502. The clocking signal may be delayed by adjustable time delay 112.

Figure 6:
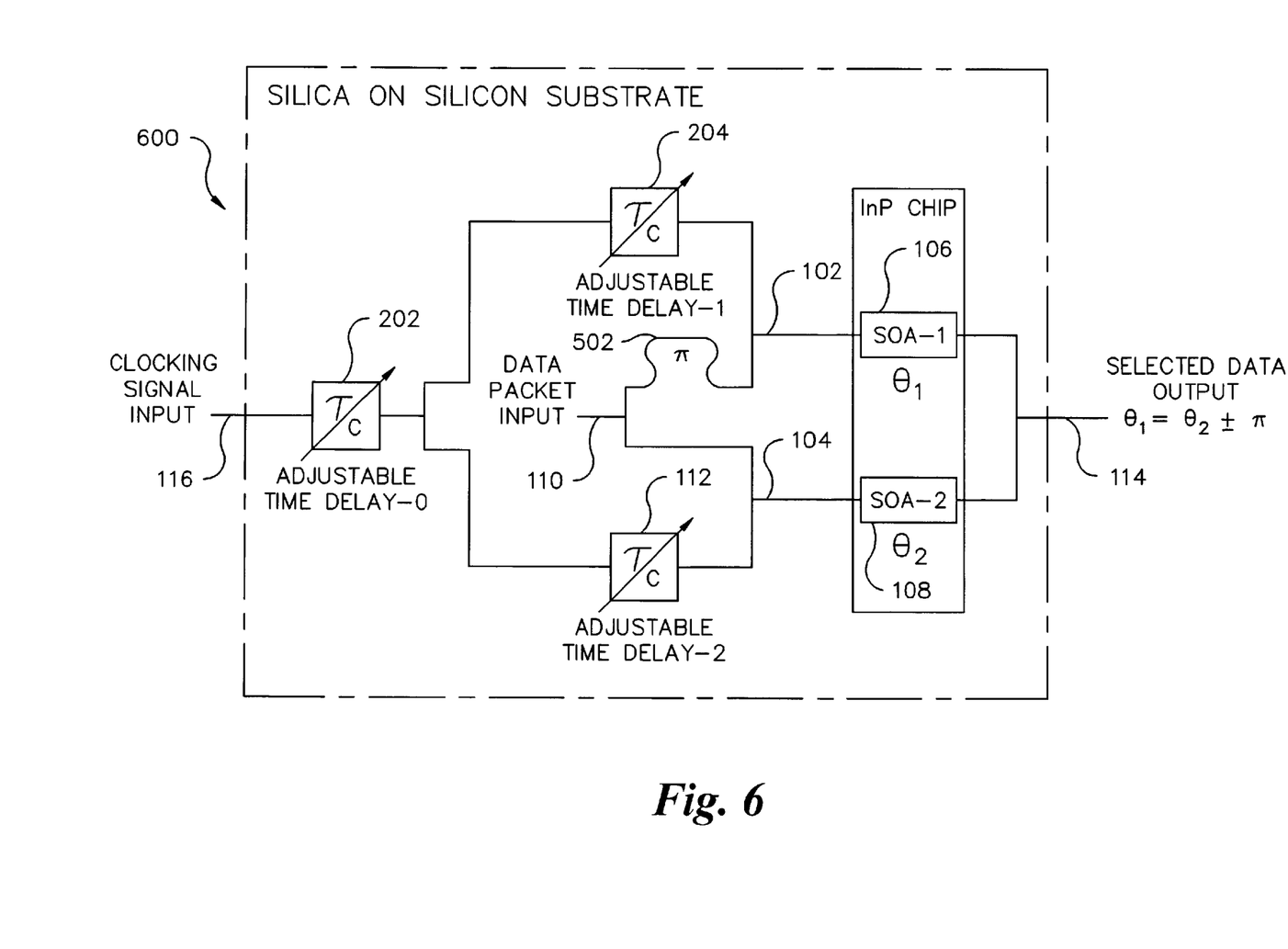
FIG. 6 shows a hybrid all-optical packet data demultiplexer chip (normally off) with multiple adjustable time delays in accordance with the present invention.

FIG. 6 shows an all-optical demultiplexer 600 in semiconductor hybrid form in accordance with the present invention. The all-optical demultiplexer 600 is similar to that shown in FIG. 5, with the exception that the all-optical demultiplexer 600 has two additional time delay elements 202, 204, each having an adjustable time delay value $\tau_c$. The time delay values $\tau_c$ of time delay elements 112, 202, 204 are varied to delay input signals that control the states of the nonlinear optical elements 106, 108.

Figure 7:
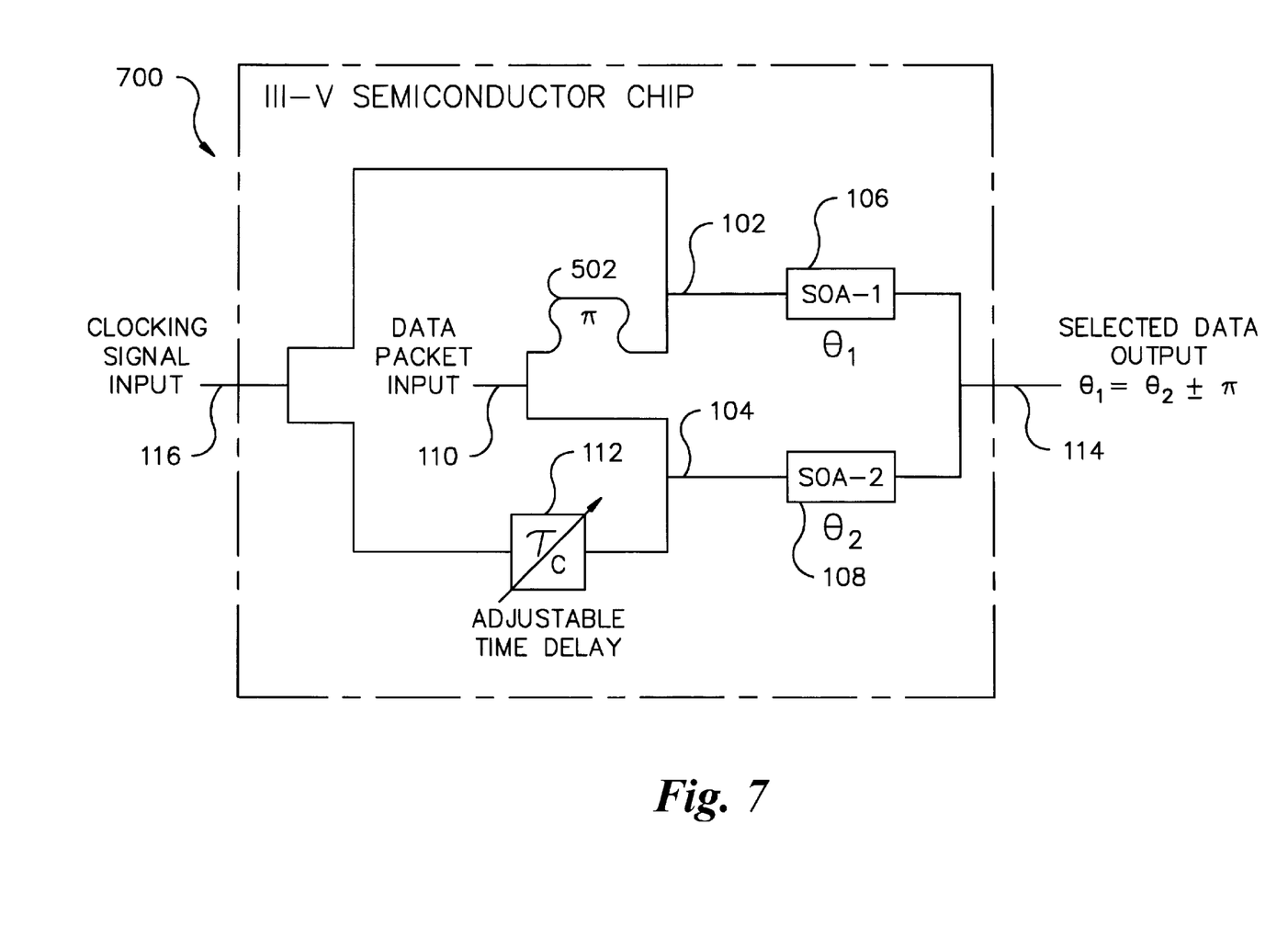
FIG. 7 shows a monolithic all-optical packet data demultiplexer chip (normally off) with a single adjustable time delay in accordance with the present invention.
Figure 8:
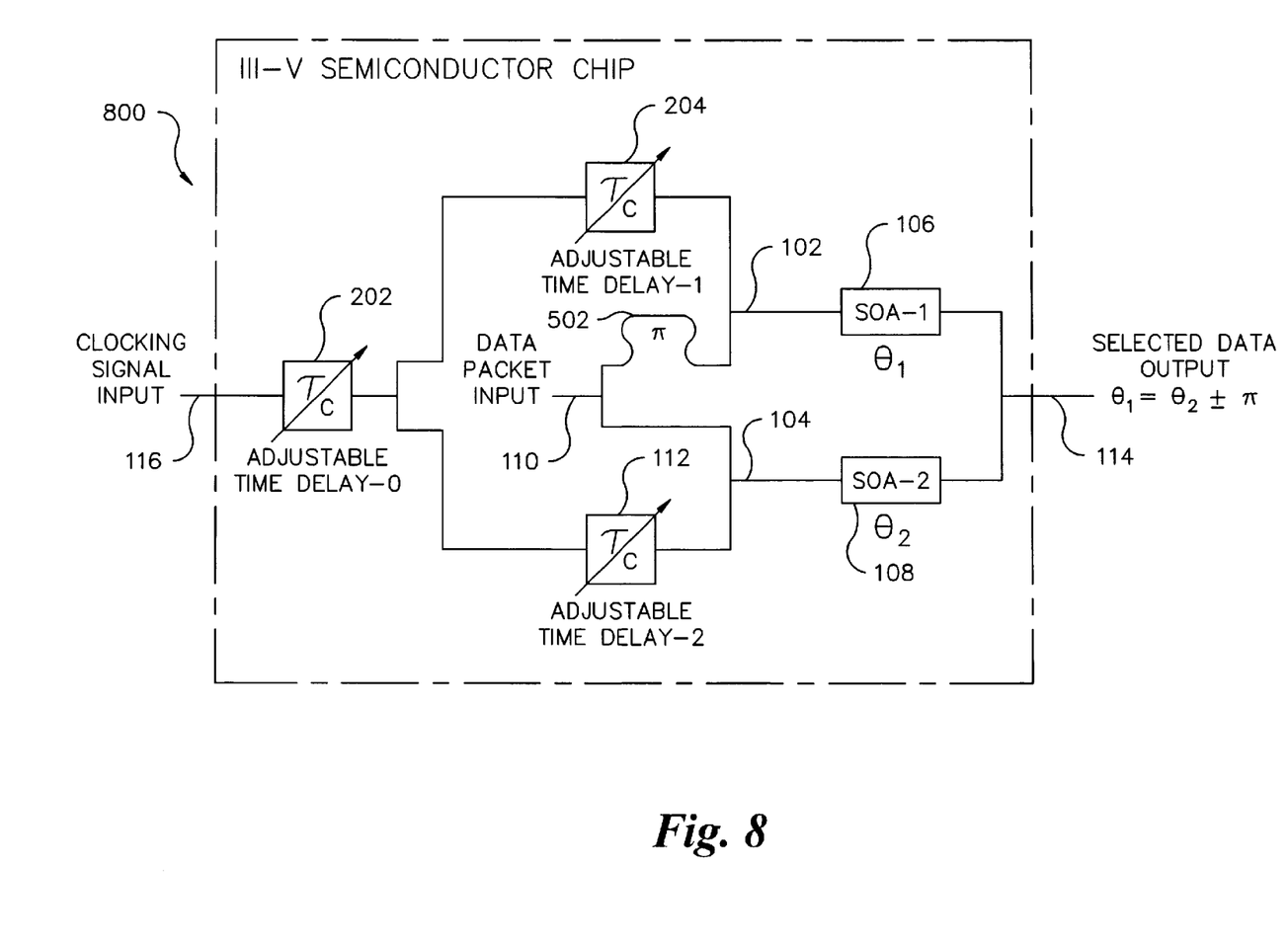
FIG. 8 shows a monolithic all-optical packet data demultiplexer chip (normally off) with multiple adjustable time delays in accordance with the present invention.

FIGS. 7 and 8 show all-optical demultiplexers 700 and 800 similar to all-optical demultiplexers 500 and 600, respectively, with the exception that all-optical demultiplexers 700 and 800 are monolithically integrated assemblies implemented using III–V compound semiconductor materials such as those typically grown on InP or GaAs substrates.

2. Detailed Description

FIG. 2 shows a hybrid all-optical demultiplexer 200 which is used to select individual bits or groups of bits in an all-optical data packet. The all-optical demultiplexer 200 utilizes destructive and constructive wave interference created by the nonlinear effects of the nonlinear optical elements 106, 108 located in the parallel arms 102, 104 of a Mach-Zehnder interferometer in conjunction with the variable time delays 112, 202, 204 to create an extremely fast all-optical demultiplexer. The outputs of the nonlinear optical elements 106, 108 are fed to the selected data output 114. Depending upon the granularity of the variable time delay, the demultiplexer 200 may even be used to select an entire data packet.

The all-optical demultiplexer 200 is used to read a single bit or a stream of bits being transmitted in an all-optical format. The all-optical demultiplexer 200 takes advantage of the extremely short period of time that it takes for the nonlinear optical elements 106, 108 to saturate. During the interval of time that the nonlinear optical elements 106, 108 are saturated, the index of refraction of the semiconductor material is different from the steady-state value. Thus, an optical wave propagating through the nonlinear optical elements 106, 108 during a period of time when the all-optical demultiplexer 200 is in a saturated state will move at a different velocity that it would ordinarily transit had it been within the all-optical demultiplexer 200 while it was in a normal steady-state condition. This difference in velocity, due to the saturation condition, implies a difference in travel time through the all-optical demultiplexer 200 which, in turn, translates into a phase difference that is used to create both destructive and constructive interference effects. The coherent wave interference phenomena can be controlled in a very fast, yet precisely timed manner, to achieve the desired functionality of the present invention described herein.

FIGS. 1–8 show that the data stream enters the all-optical demultiplexer at the data packet input 110. The single input data stream is then divided into two equal power and equal phase streams by a 3 dB integrated optical power divider. As shown in FIGS. 5–8, the upper data stream may have an additional phase shift of π radians imparted upon it, relative to the lower path, by the fixed time delay element 502. The fixed time delay element 502 may consist of a delay line of appropriate length constructed from an integrated optical waveguide.

A clocking signal (control pulse signal) is transmitted into the all-optical demultiplexer at the clocking signal input 116. The clocking signal is immediately split into two clocking signals of equal amplitude and equal phase by a 3 dB integrated optical power divider. The upper half of the clocking signal is combined with the upper half of the data stream in a 3 dB integrated optical combiner. The signals are then passed on to the nonlinear optical element 106 (SOA-1), which resides in the upper arm of an integrated Mach-Zehnder interferometer. The lower half of the clocking signal is time delayed by the adjustable time delay element 112 and then combined with the lower half of the data stream signal in a 3 dB integrated optical power combiner. These signals are then passed on to the nonlinear optical element 108 (SOA-2). The outputs of the two nonlinear optical elements 106, 108 are combined in a 3 dB coupler and the desired bit(s) is (are) output at the selected data output 114.

The selection of data in accordance with the present invention will now be described. The clocking pulse is set-up such that its amplitude (after the 3 dB split and any time delays) is adequate to saturate both of the nonlinear optical elements 106, 108 when the clock pulse arrives at the devices. Furthermore, the nonlinear optical elements 106, 108 are set-up via their dc bias conditions, in conjunction with the saturated state, to impart a phase difference of π radians (180 degrees) relative to the unsaturated state. Thus, during any period of time when the data signal experiences one of the two nonlinear optical elements 106, 108 in a saturated state while the other nonlinear optical element is in its steady-state condition, an additional π radians relative phase shift will be developed between the optical waves in the two paths of the all-optical demultiplexer. When these data signals are combined in the output 3 dB coupler, destructive interference will occur in all-optical demultiplexers 100 and 300 and there will be no detectable output signal. In all-optical demultiplexers 500 and 700, constructive interference will occur, due to the additional fixed π radian phase shift in the upper data path, and there will be a detectable output so long as the data stream is "high" during this period. Alternatively, during those periods of time when the two data signal paths encounter both nonlinear optical elements 106, 108 in identical states, either both saturated or both in their normal steady-state condition, each data signal path will experience identical phase shifts. When these signals are combined in the output 3 dB coupler, constructive interference will occur in devices 100 and 300 and high state data bits will be detectable. In devices 500 and 700, destructive interference will occur and there will not be any detectable signal. By adjusting the variable time delay, the point in time when the data signal encounters the nonlinear optical elements in different or identical states is adjusted. Thus, the particular bits to be read are selected from the data stream.

Figure 10:
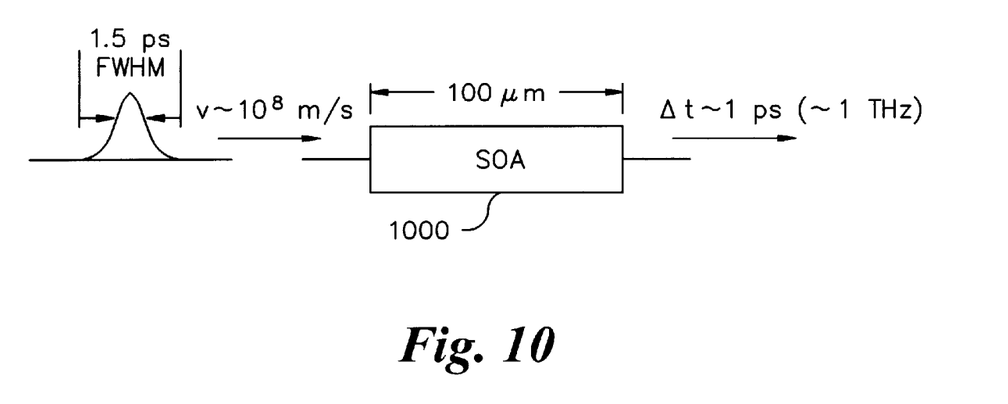
FIG. 10 shows a basic SOA transient operation in accordance with the present invention.

FIG. 10 illustrates the basic transient operation of an SOA 1000 is illustrated. The SOA 1000 will saturate and the carrier population depletion will be completed within about 1 ps (≅1 THz) from the time that the control (clock) pulse wavefront (full-width half-maximum (FWHM)≅1.5 ps) enters the SOA 1000.

Figure 11:
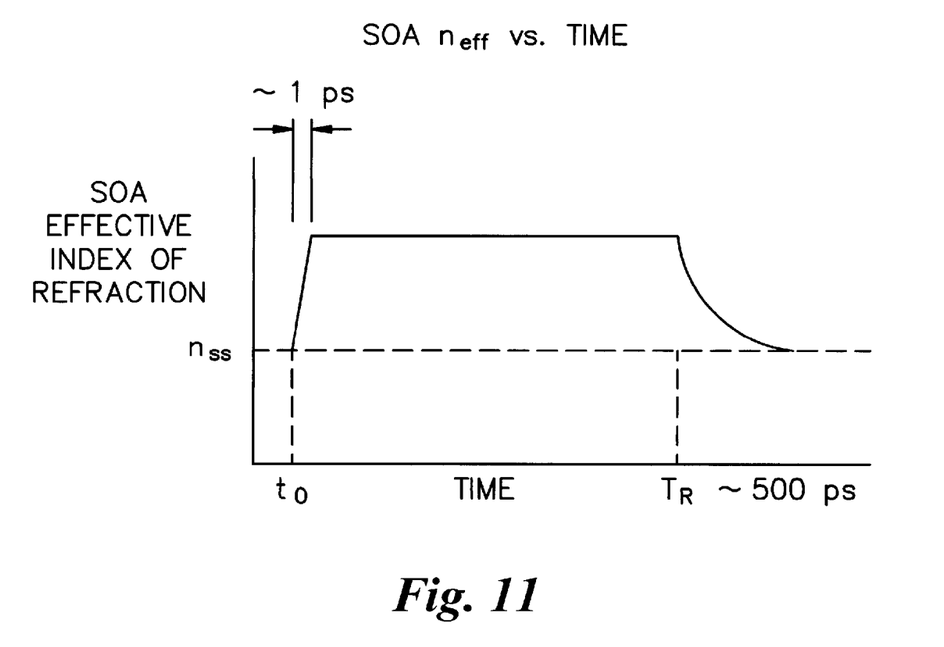
FIG. 11 shows the SOA's switching speed in accordance with the present invention.

FIG. 11 illustrates the SOA index of refraction over a period of time. The SOA will remain saturated for an extended period of time until it relaxes back to its steady-state condition of population inversion due to electrical pumping. The SOA has an extremely fast initial switching time due to the purely optical nature of the interaction. The relaxation takes about $T_R$=500 ps (=2 GHz). The delay in the restoration of the steady-state pumped condition can be substantially reduced (to only a few ps) by optically pumping the device. The recovery ($T_R$) back to its steady state is a much slower process because it is normally an electrical/statistical thermodynamic phenomenon. Applying an optical pump can speed up the recovery time.

Figure 12:
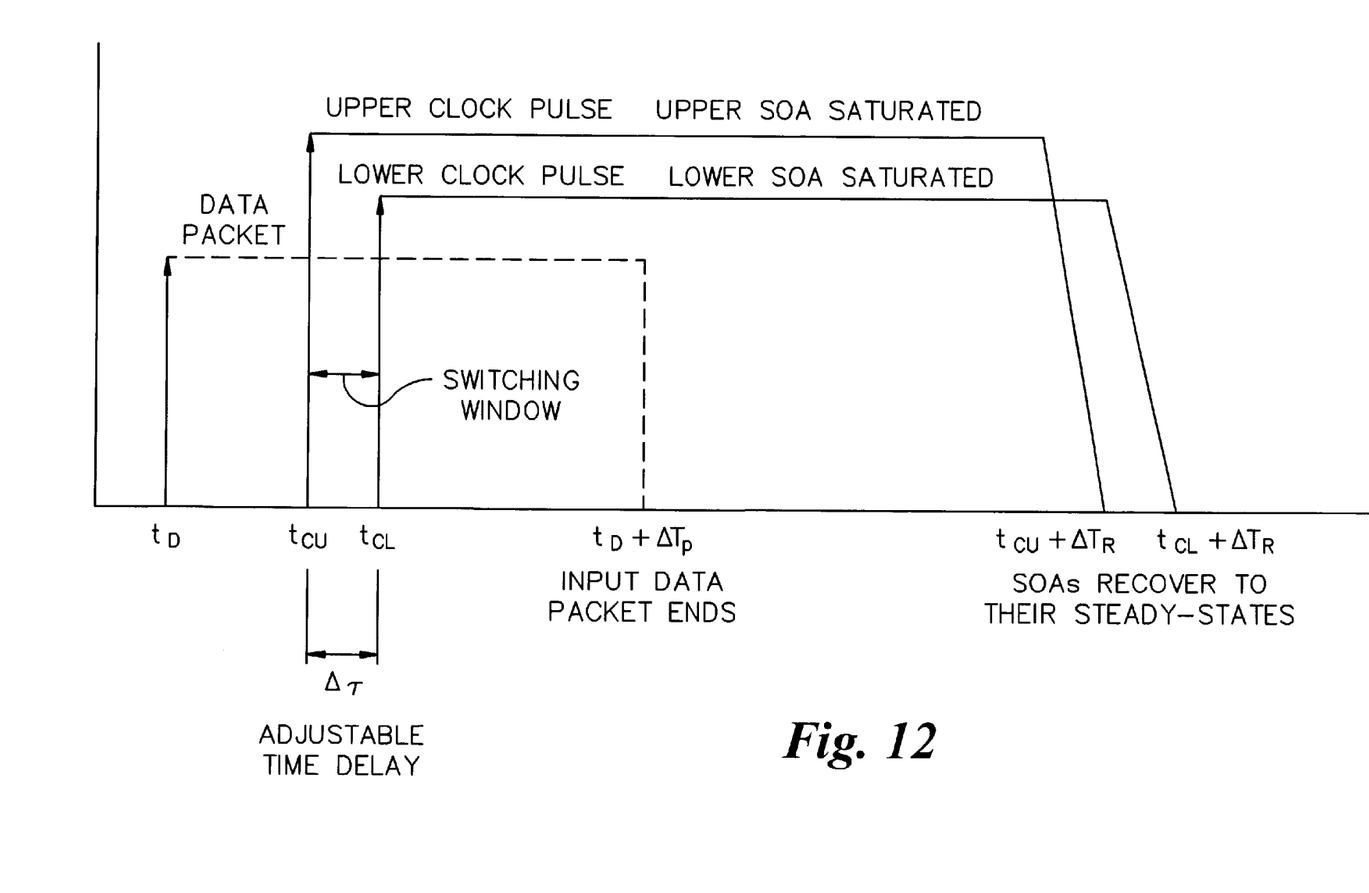
FIG. 12 shows a timing diagram of the reading/demultiplexing operation in accordance with the present invention.
Figure 13:
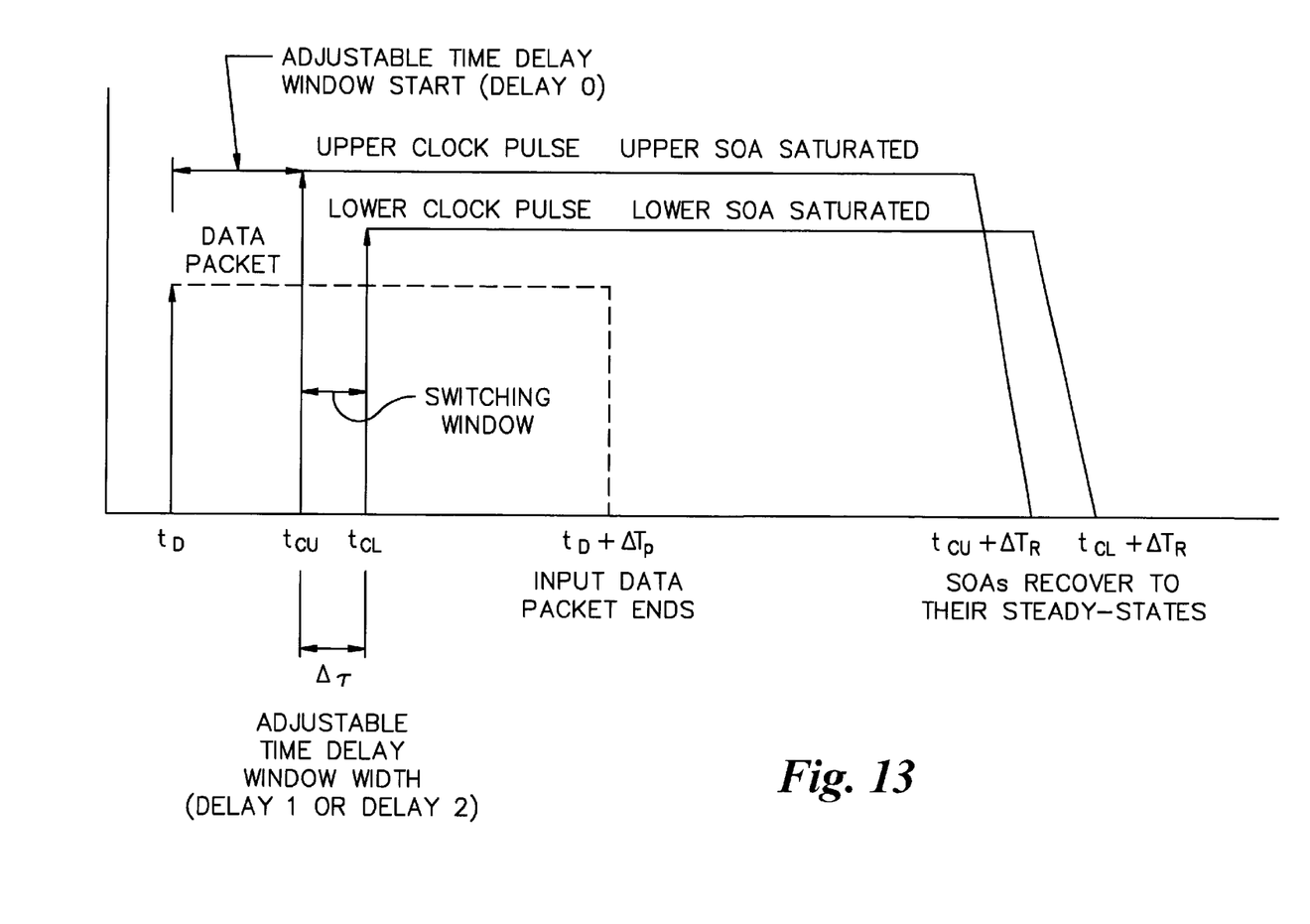
FIG. 13 shows a timing diagram of the reading/demultiplexing operation with an adjustable delay window start in accordance with the present invention.

FIGS. 12 and 13 show how the demultiplexing functions of the present invention operate. The following parameters are defined:

$t_D$=time the data signal reaches the SOA facets
$t_{CU}$=time the clock (control) pulse reaches the upper SOA facet
$t_{CL}$=time the clock (control) pulse reaches the lower SOA facet
$\Delta T_P$=Data Packet Duration
$\Delta T_B$=Single Bit Duration=1/data rate
$\Delta T_R$=SOA recovery time
$\Delta_\tau$=Adjustable time delay Referring to FIGS. 1, 3 and 12, the output signal will appear at the selected data output 114 when the data signal encounters both nonlinear optical elements 106, 108 in the same optical condition (both saturated or both in steady-state condition) because the outputs of the nonlinear optical elements 106, 108 will be in phase.

Referring to FIGS. 5 and 7, the opposite condition will be true. The output signal of the nonlinear optical elements 106, 108 will be out of phase and therefore destructive interference will occur and thus, the output will be suppressed.

By adjusting the time delay element 112 in the lower clock arm, $\Delta\tau$, the switching window width can be adjusted. In demultiplexers 100 and 300, during the period $\Delta\tau$, between $t_{CU}$ and $t_{CL}$, labeled as "Switching Window" in FIG. 12, the nonlinear optical elements 106, 108 are in different states and thus the data bits entering the nonlinear optical element facets during this interval will be suppressed and will not appear at the selected data output 114. In this case, the demultiplexer is "normally on" as the bits are only suppressed when the nonlinear optical elements 106, 108 are in different states.

The "normally off" version configuration of the present invention is shown in FIGS. 5 and 7. In all-optical demultiplexers 500 and 700, an additional, fixed, delay length of π radians (180 degrees) is inserted in the upper arm of the 3 dB power splitter used to divide the data signal. In this case, the data will be 180 degrees out of phase and will not appear at the selected data output 114 when the nonlinear optical elements 106, 108 are in the same optical state. When the nonlinear optical elements 106, 108 are in different states, the data paths will be in phase alignment and the signal will appear at the selected data output 114.

In order to select (normally off configuration) or suppress (normally on configuration) the $m^{th}$ through $n^{th}$ bits in a packet stream, the clock pulse timing must be set such that $t_{CU}$ occurs when the $m^{th}$ bit enters the device and $\Delta\tau$ must be set such that $\Delta\tau=t_{CL}-t_{CU}=T_{Bn}-T_{Bm}$, where $T_{Bn}$ and $T_{Bm}$ are the times the $m^{th}$ and $n^{th}$ bits enter the device relative to the start time of the packet. The time interval $\Delta\tau$ is set by the adjustable time delay element 112 in the lower path of the divided clock pulse (see FIGS. 1, 3, 5 and 7). It would be equally acceptable to adjust the time delay element 204 in the upper path of the split clock pulse (see FIGS. 2, 4, 6 and 8). In order to set the start time of the switching window, $t_{CU}$, the time delay element 202, located at the clock signal input prior to splitting the pulse, is adjusted. For setting the switching window width, either time delay elements 112 or 204 may be adjusted.

Referring to FIGS. 2, 4, 6, 8 and 13, the present invention is a fully "time tunable" device. The present invention incorporates an adjustable time delay 202 at the clocking signal input 116 (Delay 0) to set the start time of the switching window. The present invention incorporates an adjustable time delay 112, 204 in either the upper or lower arm of the split clock pulse (Delay 1 or Delay 2) to set the switching window width $\Delta\tau$.

The present invention may be implemented in either semiconductor hybrid form or in a completely monolithic form. The particular optimal design greatly depends upon the choice of the variable time delay mechanism. The nonlinear optical elements (e.g., SOAs) may be implemented using III–V compound semiconductor materials, such as those typically grown on InP or GaAs substrates.

Figure 9:
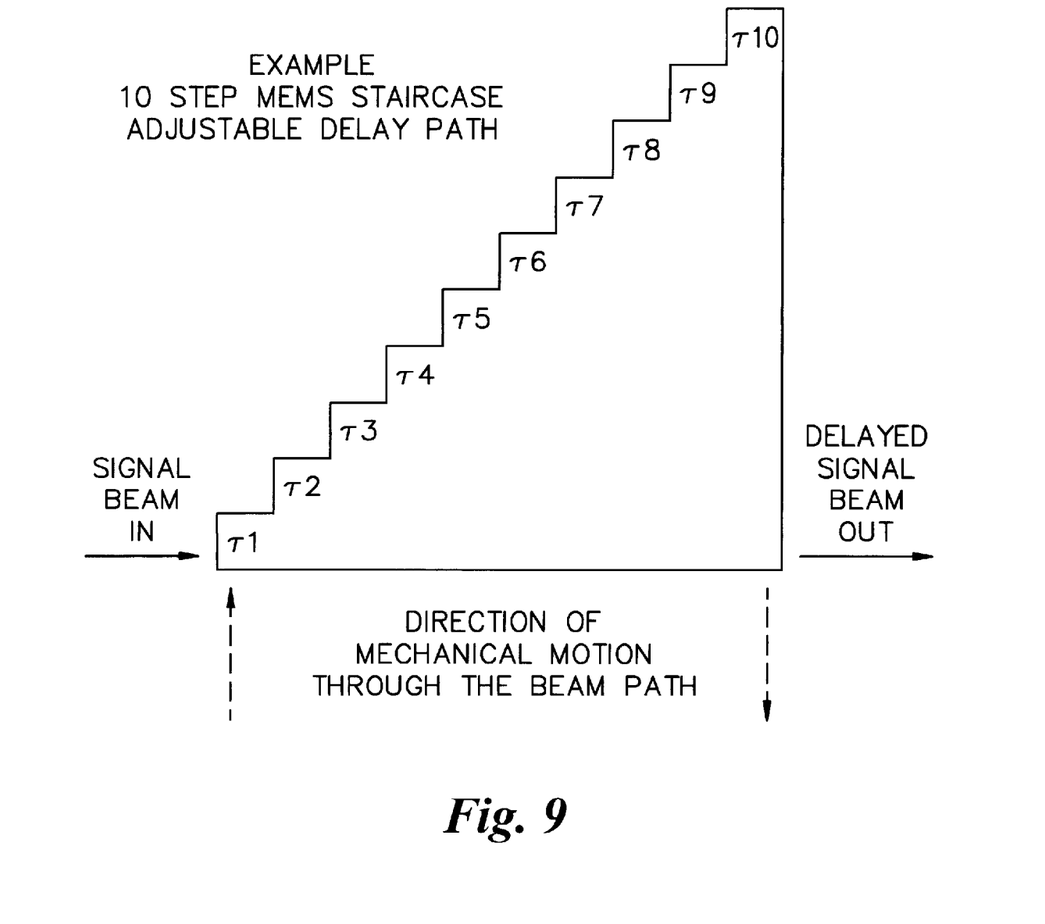
FIG. 9 shows the operation of an adjustable time delay in accordance with the present invention.

Referring to FIG. 9, if the variable time delay mechanism is to be implemented using MEMS (micro-electromechanical machines), then a hybrid form will be required such as silica on silicon substrate with the adjustable MEMS delays (or MEMS switchable delay lines) fabricated/mounted on-board (see FIGS. 1, 2, 5 and 6). A direct MEMS delay will force the beam to pass through material of variable thickness, such as a wedge or staircase. The variable thickness material is translatable into and out of the light path via the MEMS and this, in-turn, provides a variable time delay. The material selected to affect the time delay must be of high enough index of refraction so as to allow for practical device dimensions commensurate with micro fabrication technology. Alternatively, the MEMS device may simply be used to direct the optical signal through different path lengths of optical waveguide monolithically fabricated on the silica substrate, using for example shutters of translatable mirrors, thus affecting the variable time delay. The III–V semiconductor chip containing the all-optical demultiplexer is mounted on-board the silicon substrate to interface with the MEMS variable time delays via optical waveguide interfaces which form the semiconductor hybrid realization of the all-optical demultiplexer.

Thermal or heating effects (resistive heating) can be used to realize the tunable time delays. In this case, a monolithic version may be the optimal approach, where all of the components of the all-optical demultiplexer are integrated on a single III–V semiconductor chip (see FIGS. 3, 4, 7 and 8). The heating element is located in close proximity to the optical waveguide whose propagation delay is to be adjusted. By passing an electrical current through the heating element, the mechanical and opto-electric properties of the semiconductor waveguide are changed. This, in-turn, changes the delay time of the optical wave passing through the device.

Yet another way to effect the variable time delay that is also amenable to a monolithic realization of the present invention, involves directly adjusting the index of refraction of a section of optical waveguide by passing an electrical current through the waveguide. This alters the carrier concentration (electrons and holes) within the material and therefore perturbs the joint density of states and thus changes the index of refraction. This effect translates into a change in the delay time through the material because the propagation velocity of the wave changes inversely with the effective index of refraction in the waveguide.

Various types of optical buffers may be used to realize the variable time delays. This would include, for example, a recirculating (feedback) optical waveguide loop that may be made from a length of fiber optic cable or a semiconductor waveguide. In this case, the wave to be delayed is forced to circulate around a loop until the specified amount of time has passed. Then the wave is released into the circuit to effect the routing of the optical bits at the appropriate instant of time. Feed forward delays realized in optical fiber can also be used, in which the wave is switched into different lengths of fiber before reaching the nonlinear optical elements 106, 108.

Time delays can also be imposed upon a propagating wave via the electro-optic effect. An electric field can be applied to the material which alters the index of refraction. The perturbation in the index of refraction imparts a corresponding change in the optical wave's velocity which is the source of the time delay. Time delays controlled via the electro-optic effect can be realized in either the hybrid or monolithic forms of the present invention.

The present invention may be used as an integral component in all-optical digital communications network equipment. Such networks will not suffer from the typical opticalto-electrical-to-optical bottlenecking conversions of conventional systems. The present invention provides the ability to read individual bits or groups of bits being transmitted in an all-optical digital data format. The present invention can play a vital role in implementing extremely high data-rate ($\geq 40$ GB/s) packet or bursty (IP) systems. Furthermore, the present invention may be used in fiber-to-the-home/business applications where all-optical data routing will be required in the network. The present invention allows for the advancement in data capacity because it can operate over an extremely wide range of data rates from a few MB/s to hundreds of GB/s. The present invention represents an essential component in an enabling technology that will lead the way in making high data-rate and high capacity networks an economically feasible venture. Since the present invention can be implemented using semiconductor chip processing technology, its cost may ultimately fall into a range where it is inexpensive enough to be inserted, in multiples, at fiber-to-the-home/fiber-to-the-building (FTTH/FTTB) "utility boxes" located on every end user site. One only needs to provide a short pulse optical source whose repetition rate can be set to the data rate of the current state-of-the-art requirements.

The present invention may be used in the test and measurement instrumentation associated with all-optical digital data communication networks. The present invention may also find applications in scientific research or medical applications where ultra-short optical pulses are used to analyze tissues or other matter.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An all-optical demultiplexer mounted in a semiconductor device, the demultiplexer comprising:

(a) a fixed time delay element mounted in the semiconductor device for receiving a data stream, the fixed time delay element having a fixed time delay value;

(b) first and second arms mounted in the semiconductor device, the first arm receiving the data stream via the fixed time delay element and the second arm receiving the data stream directly, each arm having a nonlinear optical element for a processing the data stream; and (c) a first variable time delay element mounted in the semiconductor device for receiving a clocking signal, the variable time delay element having a first adjustable time delay value and being in communication with the second arm, wherein the first time delay value is adjusted depending upon which individual bits or groups of bits in the data stream are desired to be selected.

2. The demultiplexer of claim 1, wherein the first and second arms constitute a Mach-Zehnder configuration.

3. The demultiplexer of claim 2, further comprising:

(e) a third variable time delay element mounted in the semiconductor device, for receiving the clocking signal, delaying the clocking signal and passing the delayed clocking signal to the first and second variable time delay elements for further delaying of the clocking signal.

4. The demultiplexer of claim 1, wherein each of the nonlinear optical elements comprise a semiconductor optical amplifier (SOA).

5. The demultiplexer of claim 1, wherein the clocking signal controls the states of the nonlinear optical elements after being delayed by the first variable time delay element.

6. The demultiplexer of claim 1, wherein the first variable time delay element comprises a material of variable thickness in the shape of one of a wedge and a staircase.

7. The demultiplexer of claim 1, wherein the first variable time delay element comprises a plurality of optical waveguides of various lengths.

8. The demultiplexer of claim 1, wherein the first variable time delay element comprises a heating element which changes the properties of an optical waveguide when an electrical current is passed through the heating element.

9. The demultiplexer of claim 1, wherein the first variable time delay element comprises a waveguide having a variable index of refraction.

10. The demultiplexer of claim 1, wherein the first variable time delay element comprises an optical buffer having a recirculating optical waveguide loop.

11. The demultiplexer of claim 1, wherein the first variable time delay element comprises a material upon which an electro-optic effect is imposed.

12. The demultiplexer of claim 1, further comprising:

(d) a second variable time delay element mounted in the semiconductor device for receiving the clocking signal, the second variable time delay element having a second adjustable time delay value and being in communication with the first arm.

13. A method of demultiplexing data through an all-optical demultiplexer mounted in a semiconductor device, the demultiplexer including (i) a fixed time delay element mounted in the semiconductor device, the fixed time delay element having a fixed time delay value, (ii) first and second arms mounted in the semiconductor device, each arm having a nonlinear optical element for processing data, and (iii) at least one variable time delay element mounted in the semiconductor device, the variable time delay element having an adjustable time delay value and being in communication with the second arm, the method comprising:

(a) receiving a data stream at the first arm via the fixed time delay element and directly at the second arm;

(b) receiving a clocking signal at an input to the variable time delay element; and (c) adjusting the time delay value of the variable time delay element depending upon which individual data bits or groups of bits in the data stream are desired to be selected.

14. The method of claim 13, wherein the first and second arms constitute a Mach-Zehnder configuration.

15. The method of claim 13, further comprising:

wherein the clocking signal controls the states of the nonlinear optical elements after being delayed by the variable time delay element.

16. A Mach-Zehnder interferometer mounted in a semiconductor device, the interferometer comprising:

(a) a fixed time delay element mounted in the semiconductor device for receiving a data stream;

(b) first and second arms mounted in the semiconductor device, the first arm receiving the data stream via the fixed time delay element and the second arm receiving the data stream directly, each arm having a nonlinear optical element for processing the data stream; and (c) at least one variable time delay element inserted in at least one of the first and second arms, the variable time delay element receiving a clocking signal and having an adjustable time delay value, wherein the time delay value is adjusted depending upon which individual bits or groups of bits in the data stream are desired.

17. The interferometer of claim 16, wherein each of the nonlinear optical elements comprise a semiconductor optical amplifier (SOA).

18. An all-optical demultiplexer mounted in a semiconductor device, the demultiplexer comprising:

(a) first and second arms mounted in the semiconductor device, each arm having a nonlinear optical element for receiving a data stream; and (b) a plurality of variable time delay elements mounted in the semiconductor device for receiving and delaying a clocking signal that controls the states of the nonlinear optical elements, each of the variable time delay elements having an adjustable time delay value, wherein the time delay value is adjusted to handle different demultiplexing requirements.

19. The demultiplexer of claim 18, wherein each requirement uses a different data stream reading application.

20. The demultiplexer of claim 18, wherein the first and second arms constitute a Mach-Zehnder configuration.

21. An all-optical demultiplexer mounted in a semiconductor device, the demultiplexer comprising:

(a) first and second arms mounted in the semiconductor device, each arm having a nonlinear optical element for receiving a data stream; and (b) a variable time delay element mounted in the semiconductor device for receiving a clocking signal, the variable time delay element having an adjustable time delay value and being in communication with at least one of the arms, wherein the time delay value is adjusted depending upon which individual bits or groups of bits in the data stream are desired to be selected.

* * * * *